United States Patent [19]

Gutierrez et al.

[11] 4,455,429
[45] Jun. 19, 1984

[54] OXAZOLINES OF 2-(ALKYLTHIO)SUCCINIC ACIDS AS AN ADDITIVE FOR DRILLING MUDS

[75] Inventors: Antonio Gutierrez, Mercerville; Darrel W. Brownawell, Scotch Plains, both of N.J.; Robert C. Portnoy, Houston, Tex.; Stanley J. Brois, Westfield, N.J.

[73] Assignee: Exxon Research & Engineering Co., Florham Park, N.J.

[21] Appl. No.: 534,272

[22] Filed: Sep. 21, 1983

Related U.S. Application Data

[62] Division of Ser. No. 428,827, Sep. 30, 1982.

[51] Int. Cl.³ .................. C07D 263/08; C09K 7/00
[52] U.S. Cl. .................. 548/239; 252/8.5 C; 252/8.5 P; 252/49.3; 424/272
[58] Field of Search .......................... 548/239

[56] References Cited

U.S. PATENT DOCUMENTS

| | | | |
|---|---|---|---|
| 2,965,459 | 12/1960 | De Gray et al. | 548/239 |
| 3,654,229 | 4/1972 | Hunsucker | 548/239 |
| 3,945,998 | 3/1976 | Anderson et al. | 548/239 |
| 4,162,224 | 7/1979 | Bridger | 548/239 |

*Primary Examiner*—Mary C. Lee
*Assistant Examiner*—S. A. Gibson
*Attorney, Agent, or Firm*—Roland A. Dexter

[57] ABSTRACT

A bis-oxazoline of the formula:

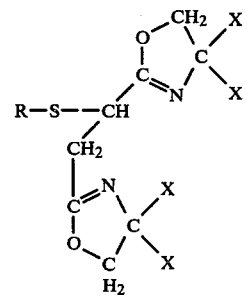

wherein R represents an alkyl group of 6 to 50 carbons and X is selected from the group containing of an alkyl or hydroxyalkyl group and at least one of the X substituents being a hydroxy alkyl group of the structure —(CH$_2$)$_n$OH where n is 1 to 3, which is useful in improving the lubricity of aqueous drilling muds.

4 Claims, No Drawings

OXAZOLINES OF 2-(ALKYLTHIO)SUCCINIC ACIDS AS AN ADDITIVE FOR DRILLING MUDS

This is a division of application Ser. No. 428,827 filed 9/30/82.

This invention relates to aqueous drilling fluids. More particularly, this invention relates to aqueous drilling fluids having incorporated therein a minor amount of an oxazoline of 2-(alkylthio) diacids which are especially effective as stable lubricity modifiers for drilling fluids. In another embodiment this invention is directed to an improved drilling operation employing the modified drilling fluids described above.

BACKGROUND OF THE INVENTION

In a drilling operation, such as in a rotary drilling operation, a drilling fluid is forced down the drill string, about the drill bit at the bottom of the borehole and then back up to the surface. The drilling fluid employed in such a drilling operation usually is an aqueous drilling fluid and is compounded of various materials in order to impart certain desirable physical and chemical properties to the drilling fluid. For example, there is usually incorporated in an aqueous drilling fluid a hydratable clayey material, such as a bentonite clay, to impart desirable viscosity and gel strength properties to the drilling fluid so as to better enable the drilling fluid to carry away the drilling cuttings from the bottom of the borehole. Other materials such as weighting agents, e.g., barium sulfate, are employed to increase the density of the drilling fluid so as to make the drilling operation more effective and safer by overcoming the fluid pressure within the formation being drilled. Other materials such as water loss improving agents, e.g., carboxymethylcellulose, hydrolyzed starch, etc. are added to reduce the loss of fluid from the drilling fluid into the formation during the drilling operation. Still other materials such as corrosion inhibitors, bactericides and drill bit lubricants are incorporated in the drilling fluid in order to improve the drilling operation and the drilling fluid.

Although a wide variety of materials designed to increase the lubricity of aqueous drilling fluids have been proposed and used in the field such as: vegetable oils including soybean and rice oil; tall oil; sodium salts of petroleum sulfonic acids and resin acids (see U.S. Pat. No. 4,064,056); polyethoxylated tetralkylacetylenic diols; the reaction products of thio-bis-alkanols mono-and di-ester and $C_{12}$-$C_{50}$ alkyl succinic acid or anhydride (see U.S. Pat. Application Ser. No. 277053, filed June 24, 1981 of common assignee); and, $C_1$-$C_{31}$ thioglycolic acid oxazolines (see U.S. Pat. Application Ser. No. 428826 filed 9-30-1982 of common assignee), it remains essential that lubricity of said drilling fluids be further improved to reduce the energy requirement of said drilling and abrasion of the drilling equipments.

It is therefore an object to provide an additive composition for drilling fluids that reduces the drilling torque.

SUMMARY OF THE INVENTION

It has been discovered that the addition of a minor amount of mono- or bis-oxazoline of an alkylthiosuccinic acid or anhydride and mixtures thereof, formed by the reaction of (a) a 2-(alkylthio) succinic acid or anhydride or mixtures thereof wherein the aliphatic hydrocarbon group contains a total of from 6 to 50, preferably 8 to 30, optimally 14 to 22, carbon atoms; with (b) 1 to 2 moles, per mole of the thiosuccinic acid or anyhydride of a 2,2-disubstituted-2-amino-1-alkanol containing a total of 4 to 8 carbon atoms to an aqueous drilling fluid substantially increases the lubricity of said drilling fluid as measured, for example, by torque reduction.

Useful are aqueous drilling fluids containing from 0.1 to 10, preferably 0.5 to 5, optimally 1 to 3, pounds per barrel of drilling fluid of a mono-or bis-oxazoline obtained from an alkylthiosuccinic acid or anhydride reacted with from 1 to 2 moles of said amino alkanol. These oxazolines have the structural formula:

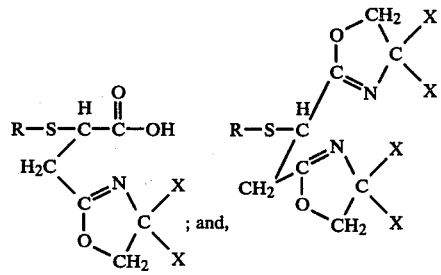

where R represents an alkyl group of 6 to 50 carbons and X is selected from the group consisting of an alkyl or hydroxyalkyl group and preferably at least one of the X substituents being a hydroxy alkyl group of the structure $-(CH_2)_nOH$ where n is 1 to 3.

DETAILED DESCRIPTION OF THE INVENTION

As used herein, the term "monooxazoline" refers to products made from equimolar proportions of said thiosuccinic acid or anhydride and amino alkanol, that is, one free carboxyl group remains, while the term "bis-oxazoline" as used herein refers to those products wherein each carboxyl group of the 2-(alkylthio)succinic acid or anhydride is converted to oxazoline by reaction with the amino alkanol.

The 2-(hydrocarbylthio)succinic acids or anhydrides are known in the art and the commonly used anhydride may be represented by the formula:

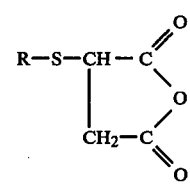

wherein R is $C_6$-$C_{50}$ aliphatic group, such as in alkyl, alkenyl, isoalkyl, isoalkenyl or cycloalkyl hydrocarbyl groups. Mercaptans derived from oligomers containing 6 to 50 carbon atoms are also suitable as the 2-alkyl group such as oligomers of $C_2$-$C_5$ monoolefins such as isobutene.

The aliphatic hydrocarbyl group may be an unsubstituted hydrocarbon group or it may contain substituents such as chlorine, bromine, phosphorous or oxygen which will not affect the utility of the final mono- or bis oxazoline product.

These compounds may be prepared by the reaction of maleic anhydride with thiols using techniques known in the art. The 2-(alkythio)succinic acids are readily produced by hydrolysis of the corresponding anhydride.

Especially preferred in preparing the novel mono- and di- ester compounds of the present invention are 2-($C_{18}$–$C_{22}$ alkylthio)succinic anhydrides, such as 2-(octadecylthio)succinic anhydride.

The term amino-alkanol as used herein is understood to represent those oxazoline-forming nitrogen compounds, i.e., a 2,2-disubstituted-2-amino-1-alkanol containing a total of 4 to 8 carbon atoms, and which can be represented by the formula:

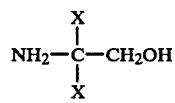

wherein X is an alkyl or hydroxy alkyl group and preferably at least one of the X substituents being a hydroxy alkyl group of the structure—$(CH_2)_nOH$, wherein n is 1 to 3.

Examples of such 2,2-disubstituted amino alkanols, include 2-amino-2-methyl-1-propanol (hereinafter designated also as AMP), 2-amino-2-methyl-1,3-propanediol (hereinafter designated also as AMPD), 2-amino-2-hydroxymethyl-1,2-propanediol (also known as tris-hydroxyaminomethane or THAM), 2-amino-2-ethyl-1,3-propanediol (hereinafter designated also as AEPD), etc. Because of its effectiveness, availability, and cost, the THAM is particularly preferred.

By sharp contrast, it has been found that other amino alcohols such as ethanolamine, propanolamine and butanolamine which lack 2,2-disubstitution, do not afford oxazoline products.

The formation of the novel oxazoline materials in substantial yield, can be effected by adding from one to two moles of the aforesaid 2,2-disubstituted-2-amino-1-alkanol per mole of the 2-(alkylthio)succinic anhydride with or without an inert diluent, and heating the mixture at 100°–240° C., preferably 170°–220° C., until reaction is completed as indicated by infrared anyalysis of the product showing maximal absorption for oxazoline and/or by the cessation of evolution of water.

Although not necessary, the presence of small amounts such as 0.01 to 2 wt. %, preferably 0.1 to 1 wt. %, based on the weight of the reactants, of a metal salt can be used in the reaction mixture as a catalyst. The metal catalyst can later be removed by filtration or by washing a hydrocarbon solution of the product with a lower alcohol, such as methanol, ethanol, isopropanol, etc. or an alcohol/water solution.

Alternatively, the metal salt can be left in the reaction mixture, as it appears to become stably dispersed, or dissolved, in the reaction product, and depending on the metal, it may even contribute performance benefits to the drilling mud.

Insert solvents which may be used in the above reaction include hydrocarbon oils, e.g. mineral lubricating oil, kerosene, neutral mineral oils, xylene, halogenated hydrocarbons, e.g., dichlorobenzene, tetrahydrofuran, etc.

Metal salts that may be used as catalysts in the invention include carboxylic acid salts of Zn, Co, Mn and Fe. Metal catalysts derived from strong acids (HCl, sulfonic acids, $H_2SO_4$, $HNO_3$, etc.) and bases, tend to diminish the yield of the oxazoline products and instead favor imide or ester formation. For this reason, these strong acid catalysts or basic catalysts are not preferred and usually will be avoided. The carboxylic acids used to prepare the desired catalysts, include $C_1$ to $C_{18}$, e.g., $C_1$ to $C_8$ acids, such as the saturated or unsaturated mono- and dicarboxylic aliphatic hydrocarbon acids, particularly fatty acids. Specific examples of such desired carboxylic acid salts include zinc acetate, zinc formate, zinc propionate, zinc stearate, maganese(ous) acetate, iron tartrate, cobalt(ous) acetate, etc. Completion of the oxazoline reaction can be readily ascertained by using periodic infrared spectral analysis to observe maximal oxyazoline formation (C═N absorption band at 6.0 microns) and/or by the cessation of water evolution.

The amount of the mono-or bis-oxazoline added to the well drilling fluid may be only a minor but sufficient amount to substantially increase the lubricity of the said drilling fluid as measured, for example, by torque reduction. The amount to be added to the well drilling fluid is in the range of from 0.1 to 10, preferably 0.5 to about 5, pounds per barrel of drilling fluid, optimally from about 1 to 3 pounds per barrel.

It has been found that the drilling fluids of the present invention exhibit a high degree of lubricity and little or no abnormal distortion of mud properties.

The additives are generally introduced into the drilling mud as a hydrocarbon solution containing broadly from at least 2 to 99, preferably 30 to 70, optimally 40 to 50, weight % additive based on the total weight of the solution. The additive can also be introduced neat, i.e., only additive, in the drilling mud when significantly dispersible in the aqueous mud. If desired, other additives such as water loss improving agents, corrosion inhibitors, bactericides, etc. can be introduced as part of the additive - solvent package into the drilling mud.

Suitable hydrocarbon solvents include: mineral oils, particularly those paraffin base oils of good oxidation stability with a boiling range of from 200° C. to 400° C. such as Mentor 28 ® sold by Exxon Chemical Americas, Houston, Tex.; diesel and gas oils; and heavy aromatic naphtha. Preferred are those above-referenced paraffin base oils.

The invention is further illustrated by the following Examples which are not to be considered as limitative of its scope.

EXAMPLE 1

Preparation of the monooxazoline from tris-(hydroxymethyl)amino methane (hereinafter THAM) and 2-(octylthio)succinic acid. 78.6 g (0.3 mole) of 2-(octylthio)succinic acid, and 36.39 (0.3 mole) of THAM were added to a reaction flask containing 20 ml of xylene. The mixture was heated to reflux until all of the water of reaction was collected in the mositure trap. The xylene was removed and a glossy type solid was obtained. The infrared spectrum of the solid featured intense ester and oxazoline absorption bands. Analytical data supports and oligomeric ester of the following monomeric structure

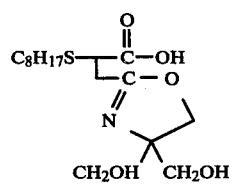

EXAMPLE 2

This example shows the preparation of a bis-oxazoline derived from the reaction of 2-amino-2-ethyl1,3-propanediol (hereinafter AEPD) and 2-(octadecylthio)-succinic acid. 68.8 g (0.17 mole) of 2-(octadecylthio)-succinic acid and 40.7 g (0.34 mole) of AEPD were added to 200 ml of xylene in a reactor fitted with a Dean Starke water trap. The mixture was refluxed until all the water of reaction was collected in the moisture trap (about 3 hours). The xylene was removed and an oily substance was obtained. A white solid formed upon cooling at room temperature. The infrared spectrum of the crude solid showed an intense oxazoline absorption band at 6.0 microns. It analyzed for 65.95% C., 10.66% H, 5.26% N and 5.25% S. Theory requires 67.60% C., 10.56% H, 4.93% N and 5.63% S. Spectral and analytical results are equivalent to n-octadecylthioethane-1,2-diyl-bis (5-ethyl-5-hydroxymethyl-2-oxazoline) which is believed to have the following structure.

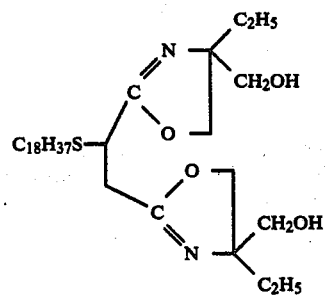

EXAMPLES 3–16

Numerous other mono and bis oxazolines were prepared according to the procedures of Examples 1 and 2. The reactants are described by name whereas the product is inferred by reference to Example 1 or 2 and physical data in the following Table I.

TABLE I

| Ex. | Reactants 2-(alkylthio)succinic acid | alkanol | Mole Ratio Acid to Alkanol | Process According To Ex. | Product Property |
|---|---|---|---|---|---|
| 3 | octyl | THAM | 2:1 | 2 | brown glassy solid, mp 33–40° C. |
| 4 | octyl | THAM | 1:1 | 1 | brown glassy solid |
| 5 | octyl | AMPD | 2:1 | 2 | heavy slight brown oil |
| 6 | octyl | AMP | 2:1 | 2 | dark brown thick liquid |
| 7 | octyl | AEPD | 2:1 | 2 | light brown oil |
| 8 | octyl | AEPD | 1:1 | 1 | light brown oil |
| 9 | octadecyl | THAM | 2:1 | 2 | gold waxy solid, mp 57–69° C. |
| 10 | octadecyl | AMPD | 2:1 | 2 | heavy brown oil |
| 11 | octadecyl | AMP | 2:1 | 2 | brown waxy solid |
| 12 | octadecyl | AEPD | 2:1 | 2 | brown waxy solid |
| 13 | eicosanyl | THAM | 2:1 | 2 | white solid |
| 14 | eicosanyl | AMPD | 2:1 | 2 | white solid |
| 15 | eicosanyl | AMP | 2:1 | 2 | oil/waxy solid |
| 16 | eicosanyl | AEPD | 2:1 | 2 | waxy solid |

AMP = 2-amino-2-methyl-1-propanol
AMPD = 2-amino-2-methyl-1,3-propane diol
AEPD = 2-amino-2-ethyl-1,3-propane diol
THAM = trishydroxymethylaminomethane

EXAMPLES 17–20

The lubricity activity of the formulations of the invention are shown in Table II following by comparison with a base mud. The base mud is prepared from 20 to 25 pounds of bentonite [5 to 7 wt. %], 4 to 6 pounds of lignosulfonate [1 to 2 wt. %] and sufficient sodium hydroxide to adjust the pH to 9.5 to 10.5 per barrel of water. This is the basic drilling mud to which the lubricity additives taught here are added to produce the drilling muds of much enhanced lubricity as seen from the following Table II.

The rheology data of Table I was determined on a Fann model 35 Viscosimeter purchased from Fann Industries of Houston, Tex. The torque data was determined on a Baroid Lubricity Tester available from the Baroid Division of N.L. Industries, Houston, Tex.

Although the additive product of Example 2 showed the greatest torque reduction, the product of Example 9, i.e. n-octadecylthioethane-1,2-diyl-bis-[5,5-bis(hydroxymethyl)-2-oxazoline] and the product of Example 11, i.e. n-octadecylthioethane-1,2-diyl-bis(5,5-dimethyl-2-oxazoline) both showed a lubricity activity level characteristic of the products of the invention disclosed herein.

Although the utility of the compounds of the invention has been directed to lubricity enhancement of drilling muds, each has utility requiring activity at a metal surface. The property of surface activity of these compounds and the thermal decomposition byproducts, e.g., the mono oxazoline species produces byproduct carboxyl moieties toward metal surfaces as film formers favors the use of each, alone or in combination in amounts ranging from 10 to 100 parts per million as a film former in a corrosion inhibitor formula for heat exchanger fluids in refinery equipment, in metal rolling mills as an anti spotting additive and in metal cutting fluids because of surface passivation and/or oxygen pacification.

The compounds of the invention are particularly useful as oxidation inhibitors to protect fluids such as refinery feed stream subjected to high temperatures in heat exchangers. It is believed that the combination in one molecule of sulfur (provides oxidation inhibition) and the hydroxy oxazoline 8 provides surface activity) has special value in applications where oxidative degradation is a problem. In these applications, the compounds of the invention bring the oxidative inhibition of the sulfur to the region of maximum oxidative degradation which occurs adjacent to the metal surface.

POST TREATMENT OF COMPOUNDS OF INVENTION

Treatment of the reaction products at 2-(octadecylthio) glycolic acid and 0.5 to 2 molar equivalents of tris-hydroxymethyl amino methane (THAM), for example, with tributyl phosphite affords an oxazoline phosphite ester derivative containing 0.1 to 1 wt % phosphorous with antioxidant properties.

Similarly, the boration using boric acid or ester of oxazolines from the reaction of 2-(octadecylthio) glycolic acid with 0.5 to 2 molar equivalents (THAM) gives more borate esters containing from 0.1 to 1 weight percent of boron which feature anticorrosion activity in refinery feedstreams.

Finally, the oxyalkylation of the oxazolines of the present invention with alkylene oxides provides novel derivatives adaptable to a variety of surfactant application, which require oxidation and corrosion control in oil field chemical applications.

This invention in its broader aspect is not limited to the specific details shown and described, and departures may be made from such details without departing from the principles of the invention and without sacrificing its chief advantages.

TABLE II

| Example | Lubricity Additive | Additive Conc.[1] Lb/BBl | Plastic Viscosity | Yield Point | Gel[2] | % Torque[3] Reduction |
|---|---|---|---|---|---|---|
| 17 | None | — | 55 | 3 | 2–4 | — |
| 18 | Product Ex. 2 | 2 | 46 | 14 | 3–4 | 46.8 |
| 19 | Product | 2 | 48 | 13 | 2–3 | 54.7 |
| 20 | Product Ex. 9 Ex. 11 | 2 | 64 | 35 | 4–7 | 40.7 |

[1] All additives added as a 50% concentrate in paraffinic hydrocarbon
[2] Deflection on Viscosimeter at rpm, initially and after 10 minutes
[3] As measured by Baroid Lubricity Tester relative to material of Example 17

What is claimed is:

1. A bis-oxazoline of the formula:

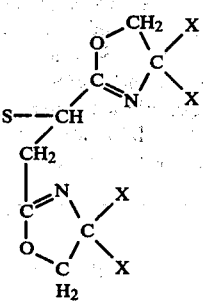

wherein R represents an alkyl group of 6 to 50 carbons and X is selected from the group consisting of an alkyl or hydroxyalkyl group and at least one of the X substituents being a hydroxy alkyl group of the structure $-(CH_2)_nOH$ where n is 1 to 3.

2. n-octadecylthioethane-1,2-diyl-bis(5-ethyl 5-hydroxymethyl- 2-oxazoline).

3. n-octadecylthioethane-1,2-diyl-bis[5,5-bis-(hydroxymethyl)- 2-oxazoline].

4. n-octadecylthioethane-1,2-diyl-bis-(5,5-dimethyl-2-oxazoline).

* * * * *